(12) United States Patent
Kellner

(10) Patent No.: US 9,316,089 B2
(45) Date of Patent: Apr. 19, 2016

(54) SEAT APPARATUS AND METHOD

(71) Applicant: Justin Kellner, Pearland, TX (US)

(72) Inventor: Justin Kellner, Pearland, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 288 days.

(21) Appl. No.: 13/864,767

(22) Filed: Apr. 17, 2013

(65) Prior Publication Data

US 2014/0138098 A1    May 22, 2014

Related U.S. Application Data

(63) Continuation of application No. 12/482,181, filed on Jun. 10, 2009, now abandoned.

(51) Int. Cl.
*E21B 34/14* (2006.01)
*E21B 34/06* (2006.01)
*F16K 1/14* (2006.01)
*F16K 1/42* (2006.01)
*F16K 15/04* (2006.01)

(52) U.S. Cl.
CPC ............... *E21B 34/06* (2013.01); *E21B 34/14* (2013.01); *F16K 1/14* (2013.01); *F16K 1/42* (2013.01); *F16K 15/04* (2013.01)

(58) Field of Classification Search
CPC ......... E21B 21/10; E21B 33/10; E21B 34/06; E21B 34/10
USPC ............................ 166/155, 193, 318, 373, 328
See application file for complete search history.

(56) References Cited

U.S. PATENT DOCUMENTS

| | | |
|---|---|---|
| 1,258,418 A | 3/1918 | Kemble |
| 1,712,948 A | 5/1929 | Burch |
| 1,998,833 A | 4/1935 | Crowell |
| 2,153,034 A | 4/1939 | Baker |
| 2,320,670 A | 6/1943 | Scaramucci |
| 2,737,244 A | 3/1956 | Baker |
| 2,769,454 A | 11/1956 | Bletcher et al. |
| 2,799,349 A | 7/1957 | Clark, Jr. |
| 2,973,006 A | 9/1957 | Nelson |
| 3,007,527 A | 1/1958 | Nelson |

(Continued)

FOREIGN PATENT DOCUMENTS

| | | |
|---|---|---|
| CN | 2544091 Y | 4/2003 |
| CN | 2584867 Y | 11/2003 |

(Continued)

OTHER PUBLICATIONS

Taken from the Internet on Oct. 11, 2010 from http://www.dsi-pblcom/downloads/4%203qtr%20Inch%20Procedure%202007.pdf.

(Continued)

*Primary Examiner* — Nicole Coy
*Assistant Examiner* — Tara Schimpf
(74) *Attorney, Agent, or Firm* — Cantor Colburn LLP

(57) ABSTRACT

A downhole fracturing system including a seat assembly having a plurality of like-sized openings therein. Each of the like-sized openings has a cross sectional area complementary to a corresponding plurality of objects such that each of the objects is matable therewith to substantially inhibit fluid flow through each like-sized opening. The objects have dimensions insufficient to mate with an opening in a next adjacent upstream seat assembly. A method of hydraulic fracturing is also included.

8 Claims, 7 Drawing Sheets

(56) References Cited

U.S. PATENT DOCUMENTS

| | | | |
|---|---|---|---|
| 2,825,412 | A | 3/1958 | Standridge |
| 3,211,232 | A | 3/1961 | Grimmer |
| 3,062,296 | A | 11/1962 | Brown |
| 3,130,783 | A | 4/1964 | Orr |
| 3,510,103 | A | 2/1968 | Carsello |
| 3,371,717 | A | 3/1968 | Chenoweth |
| 3,566,964 | A | 3/1971 | Livingston |
| 3,727,635 | A | 4/1973 | Todd |
| 3,867,985 | A | 2/1975 | Wilkinson |
| 4,253,524 | A | 3/1981 | Erickson |
| 4,258,801 | A | 3/1981 | Poston |
| 4,266,605 | A | 5/1981 | LaBorde et al. |
| 4,341,272 | A | 7/1982 | Marshall |
| 4,427,062 | A | 1/1984 | Tower |
| 4,574,894 | A | 3/1986 | Jadwin |
| 4,669,538 | A | 6/1987 | Szarka |
| 4,694,855 | A | 9/1987 | Cunningham |
| 4,826,135 | A | 5/1989 | Mielke |
| 4,834,620 | A | 5/1989 | Sweeney |
| 4,889,199 | A | 12/1989 | Lee |
| 4,893,678 | A | 1/1990 | Stokley et al. |
| 5,297,580 | A | 3/1994 | Thurman |
| 5,332,045 | A | 7/1994 | Ross et al. |
| 5,392,862 | A | 2/1995 | Swearingen |
| 5,396,953 | A | 3/1995 | Holder et al. |
| 5,404,945 | A * | 4/1995 | Head et al. ............... 166/155 |
| 5,494,107 | A | 2/1996 | Bode |
| 5,593,292 | A | 1/1997 | Ivey |
| 5,673,751 | A | 10/1997 | Head et al. |
| 5,695,009 | A | 12/1997 | Hipp |
| 5,730,222 | A | 3/1998 | Rike, Jr. |
| 5,960,881 | A | 10/1999 | Allamon et al. |
| 5,999,687 | A | 12/1999 | Abraham et al. |
| 6,155,350 | A | 12/2000 | Melenyzer |
| 6,283,148 | B1 | 9/2001 | Spears et al. |
| 6,431,270 | B1 | 8/2002 | Angle |
| 6,776,240 | B2 | 8/2004 | Kenison et al. |
| 7,069,997 | B2 | 7/2006 | Coyes et al. |
| 7,186,182 | B2 | 3/2007 | Wenzel et al. |
| 7,331,397 | B1 | 2/2008 | Wagley et al. |
| 7,500,526 | B2 | 3/2009 | Telfer |
| 7,530,400 | B2 | 5/2009 | Telfer |
| 7,533,728 | B2 | 5/2009 | Winslow et al. |
| 7,640,991 | B2 | 1/2010 | Leising |
| 7,766,034 | B2 | 8/2010 | Talaski |
| 7,775,284 | B2 | 8/2010 | Richards et al. |
| 7,798,236 | B2 | 9/2010 | McKeachnie et al. |
| 2004/0118564 | A1 * | 6/2004 | Themig et al. ............. 166/305.1 |
| 2005/0126638 | A1 | 6/2005 | Gilbert |
| 2006/0124310 | A1 | 6/2006 | Lopez De Cardenas et al. |
| 2007/0062706 | A1 * | 3/2007 | Leising ..................... 166/379 |
| 2007/0261855 | A1 * | 11/2007 | Brunet et al. ................ 166/312 |
| 2007/0272413 | A1 | 11/2007 | Rytlewski et al. |
| 2007/0295507 | A1 | 12/2007 | Telfer et al. |
| 2008/0011487 | A1 | 1/2008 | Bertane et al. |
| 2010/0084146 | A1 | 4/2010 | Roberts |
| 2012/0061103 | A1 * | 3/2012 | Hurtado .................. E21B 34/14 166/386 |

FOREIGN PATENT DOCUMENTS

| | | |
|---|---|---|
| WO | 9803766 | 1/1998 |
| WO | 9803766 A1 | 1/1998 |
| WO | WO0190529 | 11/2001 |
| WO | WO02068793 | 9/2002 |
| WO | WO2006134446 A2 | 12/2006 |

OTHER PUBLICATIONS

Imhoff, Jamie, et al. Baker Hughes Incorporated, "Composites Improve Well Construction Efficiency", SPE-125084-PP, Society of Petroleum Engineers Inc., Presentation at the 2009 SPE Annual Technical Conference and Exhibition, New Orleans, Louisiana, Oct. 4-7, 2009, pp. 1-12.

McCasland, Mark, et al., "Predicting and Mitigating Erosion of Downhole Flow-Control Equipment in Water-Injector Completions", SPE 90179, Society of Petroleum Engineers Inc., Presentation at the SPE Annual Technical conference and Exhibition, Houston, Texas Sep. 26-29, 2004, pp. 1-6.

Russell, Ronnie, et al., "Design, Analysis, and Full-Scale Erosion Testing of a Downhole Flow Control Device for High Rate Water Injection Wells" SPE 90759, Society of Petroleum Engineers Inc., Presentation at the SPE Annual Technical conference and Exhibition, Houston, Texas Sep. 26-29, 2004, pp. 1-11.

International Search Report and Written Opinion for PCT Application No. PCT/US2010/037979, dated Jan. 26, 2011, pp. 1-6.

* cited by examiner

SEAT APPARATUS AND METHOD

CROSS REFERENCE TO RELATED APPLICATION

This application is a Continuation of U.S. Non-provisional application Ser. No. 12/482,181 filed on Jun. 10, 2009, the entire disclosure of which is incorporated herein by reference.

BACKGROUND

Seats such as, for example ball seats are well known in downhole industries and especially so in the drilling and completion industry. Commonly, ball seats are used to regulate the flow of fluids and actuate downhole devices. Although ball seat configurations are many and are ubiquitous in their use within the art, the number of stacked ball seats that can be employed with traditional systems is limited. Improving the number of ball seats that may be stacked in a borehole will be welcomed by the art.

SUMMARY

A downhole fracturing system including a seat assembly having a plurality of like-sized openings therein, each of the like-sized openings having a cross sectional area complementary to a corresponding plurality of objects such that each of the objects is matable therewith to substantially inhibit fluid flow through each like-sized opening, the objects having dimensions insufficient to mate with an opening in a next adjacent upstream seat assembly.

A hydraulic fracturing system, including a first seat assembly including at least one first opening therethrough having at least one first cross-sectional area, the first seat assembly operatively arranged to receive a first object having a first size greater than the first cross-sectional area while permitting smaller objects to pass through the at least one first opening; and a second seat assembly positioned downstream of the first seat assembly and having a plurality of second openings, each of the second openings having a second cross-sectional area, the second seat assembly operatively arranged to receive a plurality of second objects each having a second size smaller than the first size after the second objects have passed through the at least one opening in the first seat assembly, each one of the plurality of second openings corresponding to a corresponding one of the second objects for obstructing fluid flow through the second openings when the second objects are landed at the second seat assembly.

A method of hydraulic fracturing including dropping a plurality of first objects each having a first size; landing the plurality of first objects at a first seat assembly, each of the plurality of first objects associated with one of a plurality of first openings in the first seat assembly; obstructing fluid flow through the first seat assembly with the plurality of first objects; and performing a fracturing operation with fluid upstream of the first seat assembly.

BRIEF DESCRIPTION OF THE DRAWINGS

Referring now to the drawings wherein like elements are numbered alike in the several figures.

DETAILED DESCRIPTION

Figure 1:
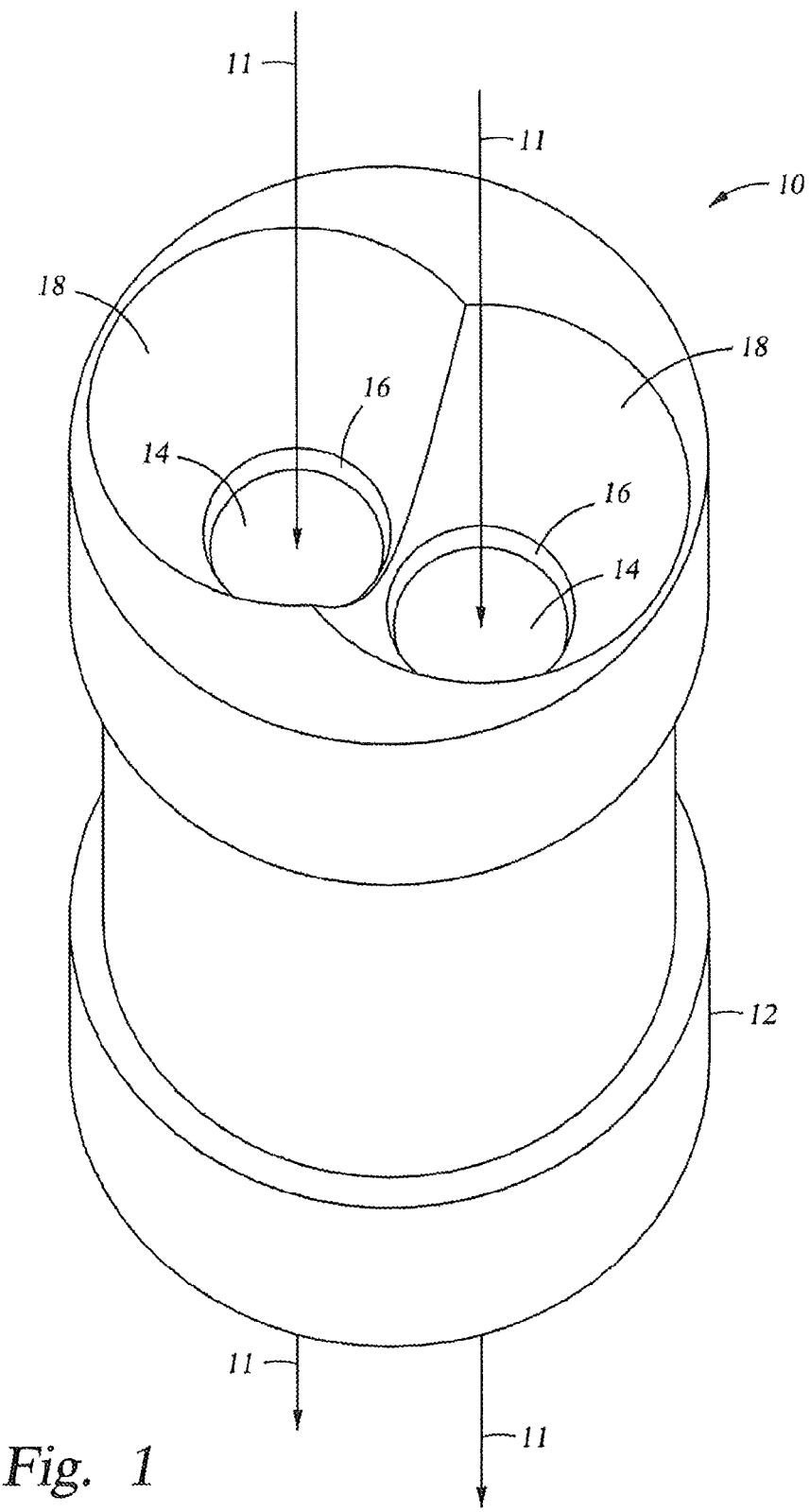
FIG. 1 is a perspective view of an embodiment of a ball seat.
Figure 1A:
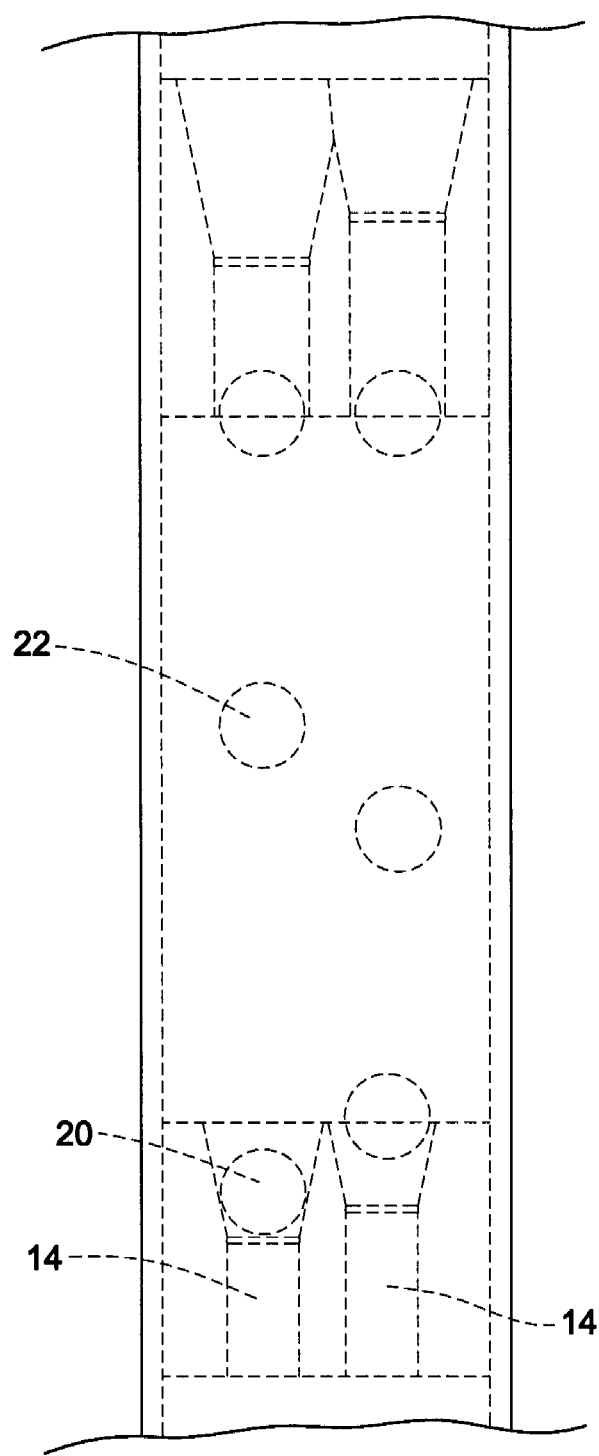
FIG. 1A depicts a downhole system including a first seat assembly arranged upstream of a second seat assembly.

Referring to FIG. 1, an exemplary embodiment of a ball seat 10 is illustrated. The ball seat 10 includes a housing 12 that includes tubular orifices 14. The tubular orifices 14 define flow paths indicated by the arrows 11. Seats 16 are disposed at the apertures of the orifices 14. The illustrated embodiment includes concave portions 18 defined by the housing 12. The concave portions may be, for example, conical (see FIG. 2), parabolic (see FIG. 2a), or cylindrical in shape.

Figure 2:
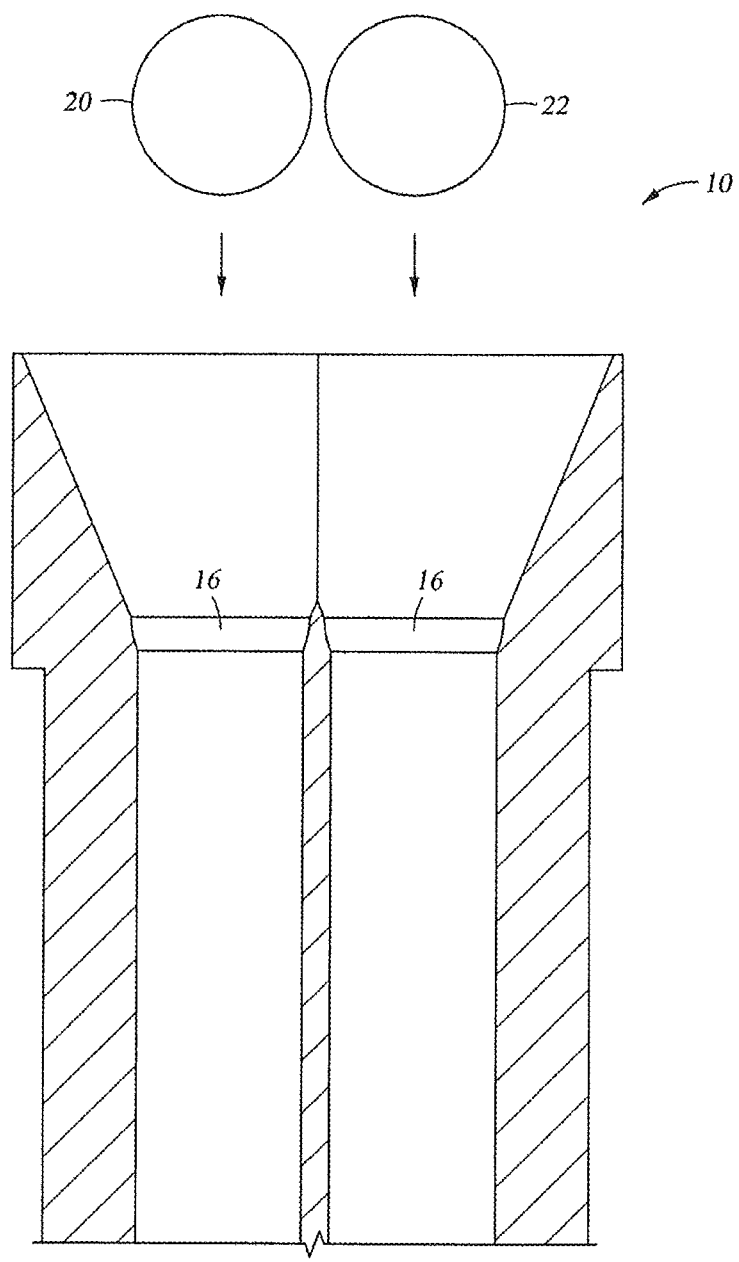
FIG. 2 is a cut-away side view of the ball seat of FIG. 1.
Figure 2A:
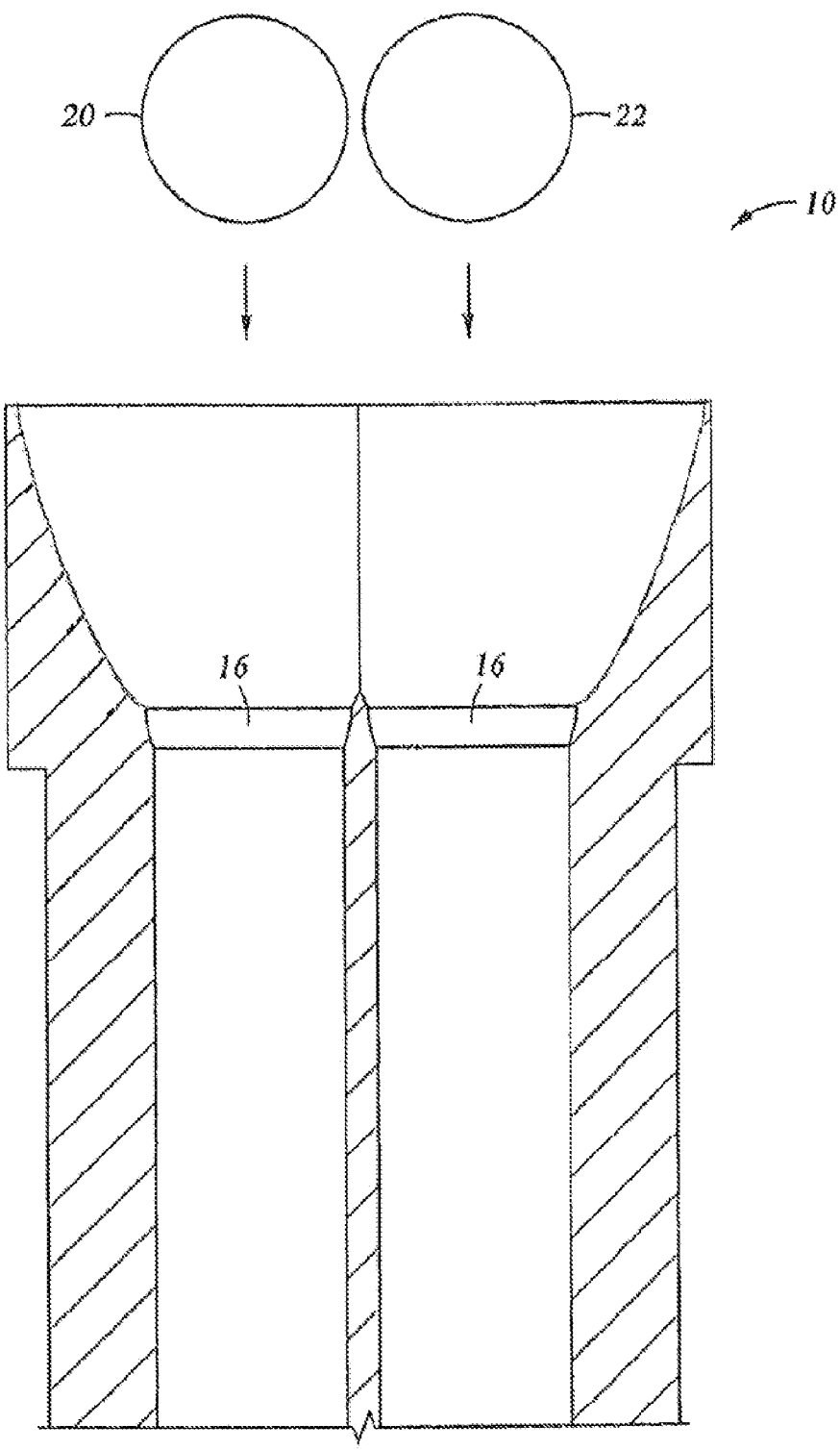
FIG. 2a is a cut-away side view of the ball seat of FIG. 1 illustrating the parabolic embodiment.

FIG. 2 illustrates a cut-away view of the ball seat 10. In operation, the ball seat 10 may be placed downhole in a borehole. A first object 20 such as, for example, a spherical object may be introduced into the borehole and driven towards the ball seat 10 by, for example, hydraulic pressure or gravity. One of the concave portions 18 directs the first object 20 into engagement with a seat 16; blocking an orifice 14 and obstructing a flow path 11. A second object 22 may similarly be driven towards the ball seat 10 and directed by the concave portions 18 into the empty seat 16; blocking the second orifice 14 and obstructing the second flow path 11. The obstruction of the flow paths allows an operator to pressure up against the obstructed ball seat 10 to facilitate a downhole pressure based operation. This may be a fracturing job or actuation of a desired downhole device, or to otherwise effect desired downhole operations.

Previous ball seat devices using a single orifice and seat arrangement may be less effective when the cross sectional areas of the orifice (and the associated diameter of the object) are less than a defined threshold cross sectional area. The threshold diameter may be a different diameter for different borehole systems and is associated with the likelihood of a pressure increase upstream of the orifice due to its restricted flow area. Orifice cross sectional areas less than the threshold cross sectional area may undesirably restrict the flow of fluid and cause the undesired and premature actuation of tools or other premature operations uphole relative to the ball seat device. The illustrated embodiments having more than one orifice allow the cross sectional areas of individual orifices (and the associated diameter of the objects) to be reduced while avoiding the restriction of the flow of fluid since the use of multiple orifices allows the net cross sectional area of the orifices to remain greater than the threshold cross sectional area.

Figure 3:
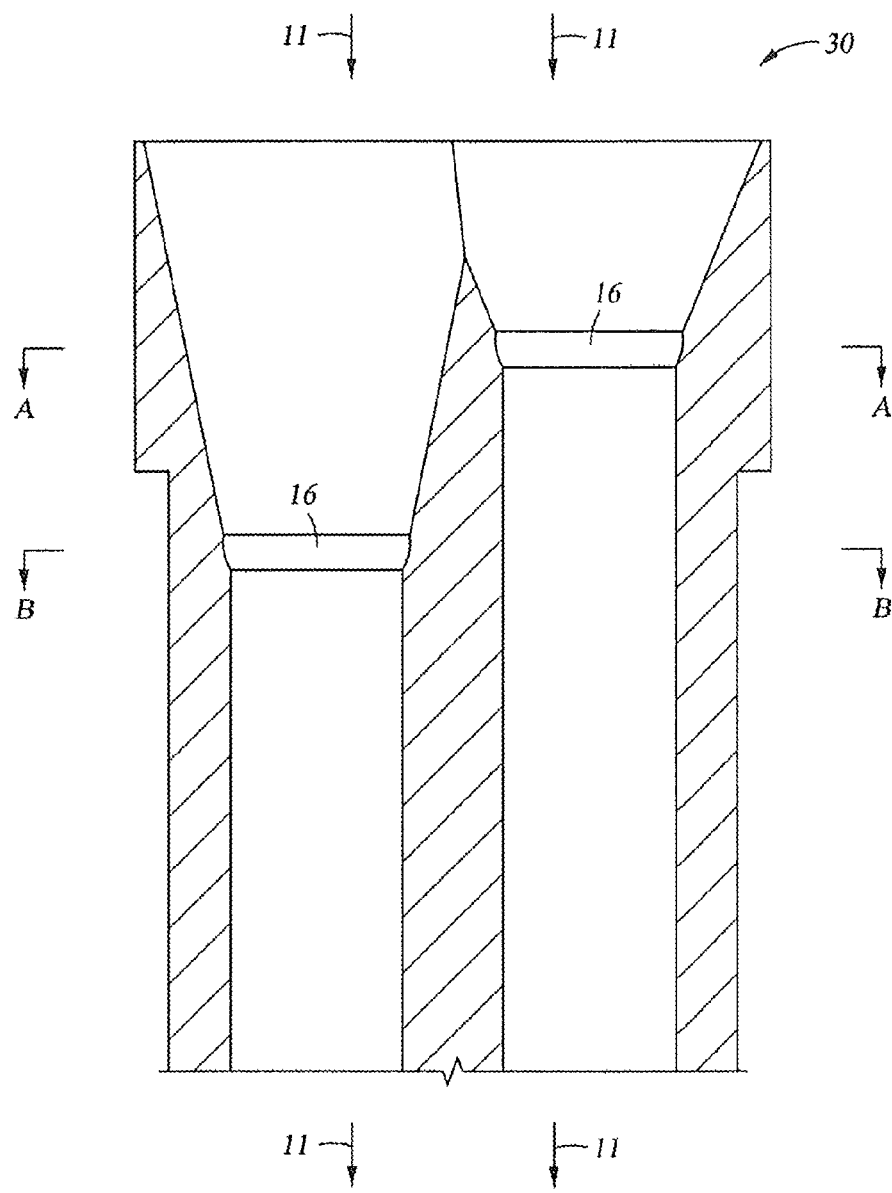
FIG. 3 is a side cut-away view of a portion of an alternate embodiment of a ball seat.

FIG. 3 illustrates a side cut-away view of a portion of an alternate exemplary embodiment of a ball seat 30. The ball seat 30 is similar in operation to the ball seat 10 (of FIGS. 1 and 2) however; the seats 16 in the illustrated embodiment are disposed in different planes (A and B). In the illustrated example, the plane B is located downstream in the flow path direction (as indicated by the arrows 11) relative to the plane A. The disposition of the seats 16 in different planes may improve the performance of the ball seat 30.

Figure 4:
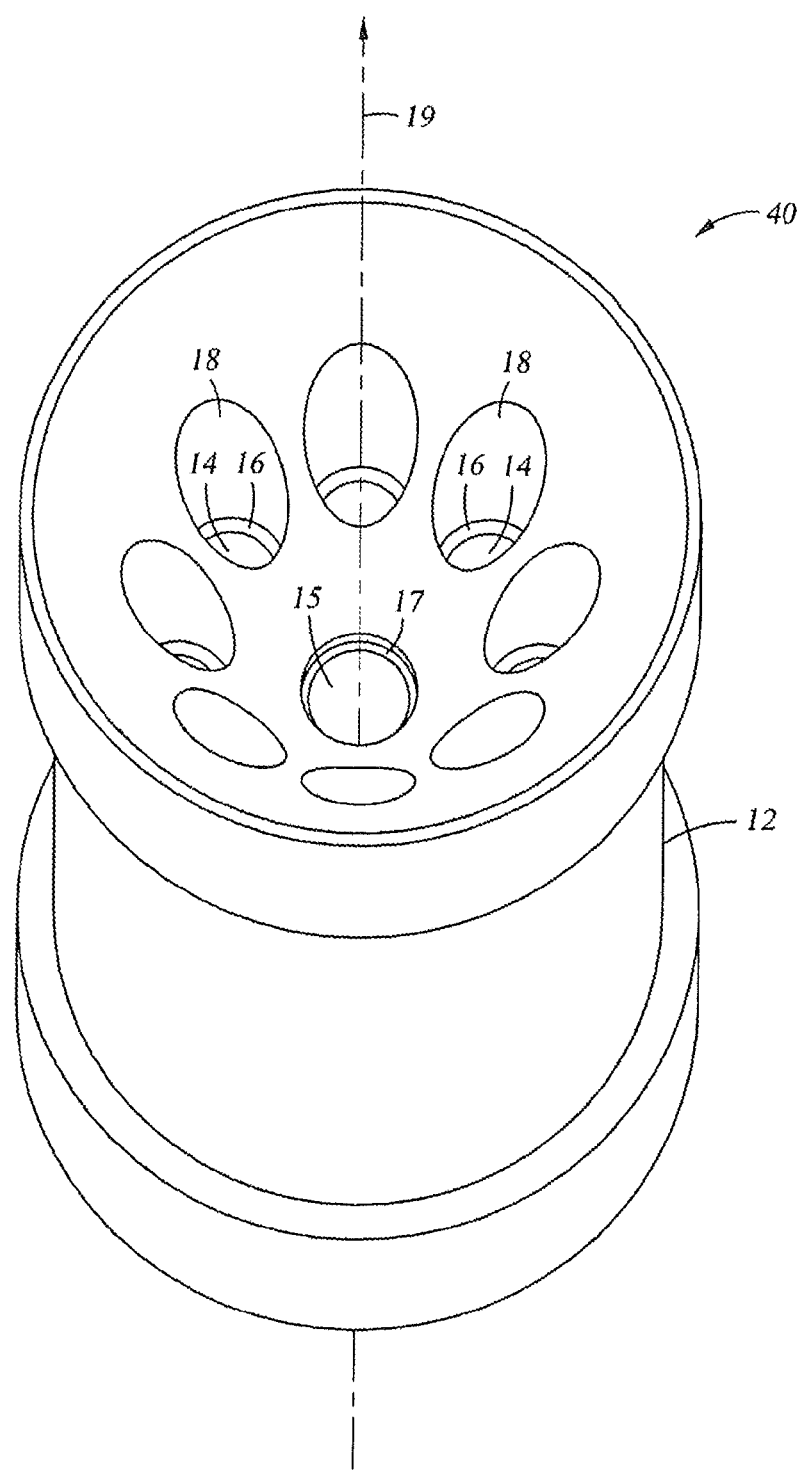
FIG. 4 is a perspective view of another alternate embodiment of a ball seat.
Figure 5:
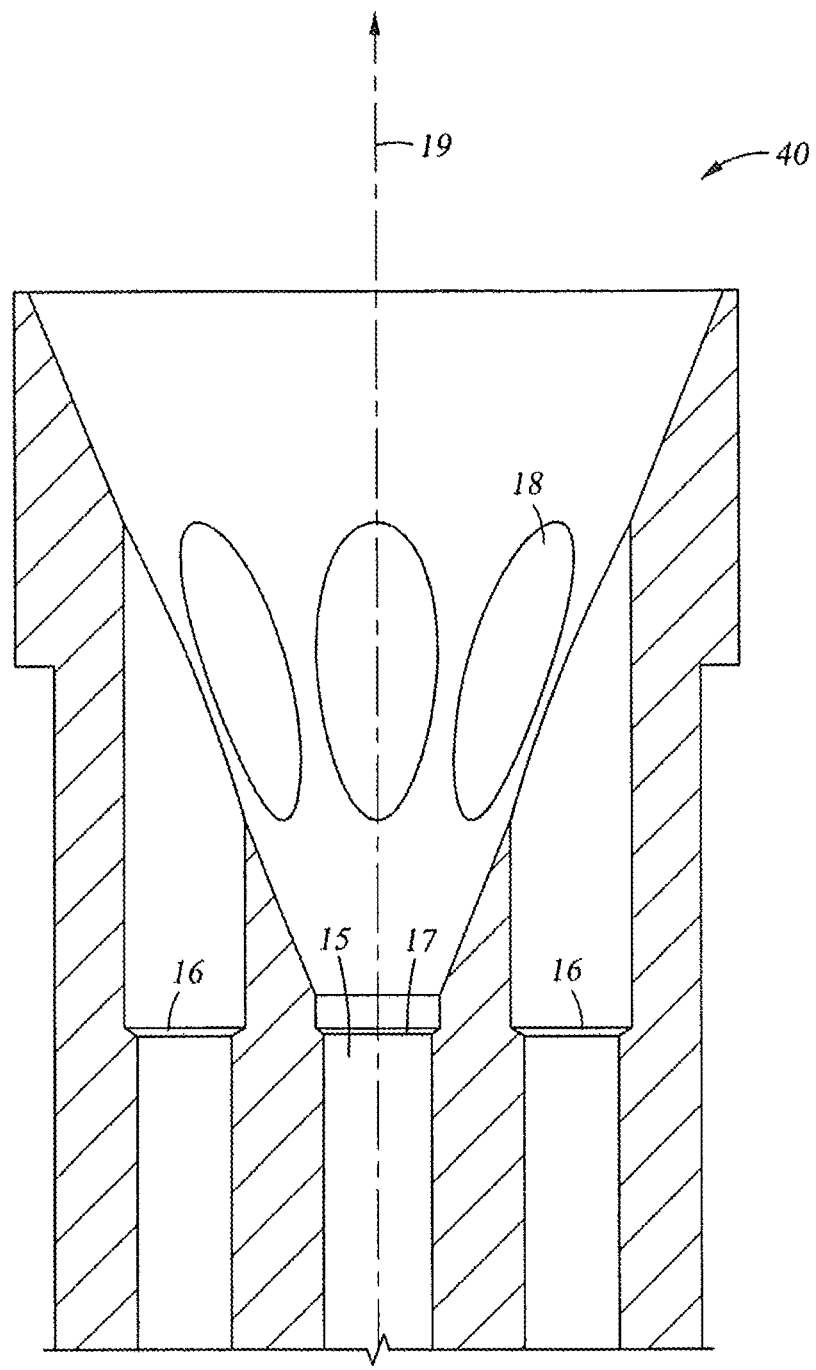
FIG. 5 is a side cut-away view of the ball seat of FIG. 4.

FIG. 4 illustrates another alternate embodiment of a ball seat 40. The ball seat 40 operates in a similar manner to the embodiments described above, and includes a plurality of seats 16 and concave portions 18. In the illustrated embodiment, a seat 17 and associated flow path 15 have an axis coincident to the longitudinal axis 19 of the ball seat 40. The seats 16 and associated flow paths 14 are disposed radially about the axis 19 in the housing 12. FIG. 5 illustrates a side partially cut-away view of a portion of the ball seat 40 (of FIG. 4).

The Figures described above illustrate exemplary embodiments of ball seats. Other embodiments may include any number of ball seats having multiple seat portions, flow paths, alignment planes, and shapes that are operative to direct objects to engage the seats.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole fracturing system comprising:
a seat assembly having a plurality of like-sized openings therein, each of the like-sized openings having a cross sectional area complementary to a corresponding plurality of objects such that each of the objects is matable therewith to substantially inhibit fluid flow through each like-sized opening, the objects having dimensions insufficient to mate with an opening in a next adjacent upstream seat assembly, wherein a first opening of the plurality of like-sized openings is disposed on a first plane and a second opening of the plurality of like-sized openings is disposed on a second plane off-set of the first plane along an axis extending substantially longitudinally through the seat assembly.

2. The seat apparatus as claimed in claim 1 wherein the seat assembly includes a concave portion operative to guide the objects towards the like-sized openings.

3. The seat apparatus as claimed in claim 1 wherein the like-sized openings are coplanar.

4. The seat apparatus as claimed in claim 1 wherein the objects are spherically shaped.

5. A hydraulic fracturing system, comprising:
a first seat assembly including at least one first opening therethrough having at least one first cross-sectional area, the first seat assembly operatively arranged to receive a first object having a first size greater than the first cross-sectional area while permitting smaller objects to pass through the at least one first opening; and
a second seat assembly positioned downstream of the first seat assembly and having a plurality of second openings, each of the second openings having a second cross-sectional area, the second seat assembly operatively arranged to receive a plurality of second objects each having a second size smaller than the first size, after the second objects have passed through the at least one opening in the first seat assembly, each one of the plurality of second openings corresponding to a corresponding one of the second objects for obstructing fluid flow through the second openings when the second objects are landed at the second seat assembly, wherein a first opening of the plurality of second openings is disposed on a first plane and a second opening of the plurality of second openings is disposed on a second plane off-set of the first plane along an axis extending substantially longitudinally through the second seat assembly.

6. A method of hydraulic fracturing comprising:
dropping a plurality of first objects each having a first size;
landing the plurality of first objects at a first seat assembly, each of the plurality of first objects associated with one of a plurality of first openings in the first seat assembly, wherein a first one of the plurality of first openings is disposed on a first plane and a second one of the plurality of first openings is disposed on a second plane off-set of the first plane along an axis extending substantially longitudinally through the first seat assembly;
obstructing fluid flow through the first seat assembly with the plurality of first objects; and
performing a fracturing operation with fluid upstream of the first seat assembly.

7. The method of claim 6, wherein dropping the plurality of first objects includes passing the plurality of first objects through at least one second opening in a second seat assembly located upstream of the first seat assembly.

8. The method of claim 7, further comprising dropping a second object having a second size larger than the first size and landing the second object at the second seat assembly in order to obstruct fluid flow through the second seat assembly.

* * * * *